(12) United States Patent
Wu et al.

(10) Patent No.: US 11,195,306 B2
(45) Date of Patent: Dec. 7, 2021

(54) HIGH BIT-DEPTH GRAPHICS COMPRESSION

(71) Applicant: Avago Technologies International Sales Pte. Limited, Singapore (SG)

(72) Inventors: David Chao Hua Wu, San Diego, CA (US); Brian Francis Schoner, Fremont, CA (US); Richard Hayden Wyman, Sunnyvale, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 225 days.

(21) Appl. No.: 16/391,145

(22) Filed: Apr. 22, 2019

(65) Prior Publication Data

US 2019/0325613 A1 Oct. 24, 2019

Related U.S. Application Data

(60) Provisional application No. 62/661,597, filed on Apr. 23, 2018.

(51) Int. Cl.
| | |
|---|---|
| *G06K 9/36* | (2006.01) |
| *G06T 9/00* | (2006.01) |
| *G06T 1/20* | (2006.01) |
| *G06T 3/40* | (2006.01) |

(52) U.S. Cl.
CPC .............. *G06T 9/00* (2013.01); *G06T 1/20* (2013.01); *G06T 3/403* (2013.01); *G06T 3/4007* (2013.01)

(58) Field of Classification Search
CPC .......... G06T 9/00; G06T 1/20; G06T 3/4007; G06T 3/403
USPC ....................................................... 382/232
See application file for complete search history.

(56) References Cited

U.S. PATENT DOCUMENTS

| | | | |
|---|---|---|---|
| 2016/0196632 A1* | 7/2016 | Schoner | G06T 9/00 345/555 |
| 2017/0025098 A1* | 1/2017 | Keramidas | G09G 5/39 |

\* cited by examiner

*Primary Examiner* — Stephen P Coleman
(74) *Attorney, Agent, or Firm* — Morgan, Lewis & Bockius LLP

(57) ABSTRACT

A device implementing the subject high bit-depth graphics compression may include at least one processor configured to receive pixel data for a pixel block, obtain endpoints of a first bit length based on the pixel data in the pixel block, quantize the endpoints to a second bit length smaller than the first bit length, select the quantized endpoints for pixel values in the pixel block, determine a weight for each pixel of the pixel block in each of a plurality of planes corresponding to the endpoints selected for the pixel block, and generate a compressed data block representative of the pixel block based at least on the endpoints for the pixel block and the weight for each pixel of the pixel block in each of the plurality of planes corresponding to the endpoints. A method and computer program product implementing the subject high bit-depth graphics compression is also provided.

27 Claims, 8 Drawing Sheets

HIGH BIT-DEPTH GRAPHICS COMPRESSION

CROSS-REFERENCE TO RELATED APPLICATIONS

This application claims the benefit of priority of U.S. Provisional Application No. 62/661,597, entitled "VIDEO CODING," filed on Apr. 23, 2018, and is related to co-pending U.S. patent application Ser. No. 14/588,615, entitled "SYSTEM AND METHOD FOR GRAPHICS COMPRESSION," filed on Jan. 2, 2015, all of which are hereby incorporated by reference in their entirety.

TECHNICAL FIELD

The present description relates generally to video encoding, compression, and/or storage and video decoding, decompression, and/or storage, but not exclusively, to high bit-depth graphics compression.

BACKGROUND

Standard dynamic range (SDR) media, including images, videos, and renderings, has a limited dynamic range for luminance values or brightness of pixels, constrained by the bit depth or number of bits that may be used to represent the luminance of the pixels according to encoding and decoding standards (e.g. 8 bits per sample). By contrast, high dynamic range (HDR) media standards provide more bits or a greater bit depth (e.g. 10, 12, 16, 24, 32 bits or more per sample), allowing a greater range in the image between white and black or bright and dark regions without introducing unacceptable amounts of contouring due to excessive quantization. As a result, media may have higher contrast, darker dark sections and brighter bright sections.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
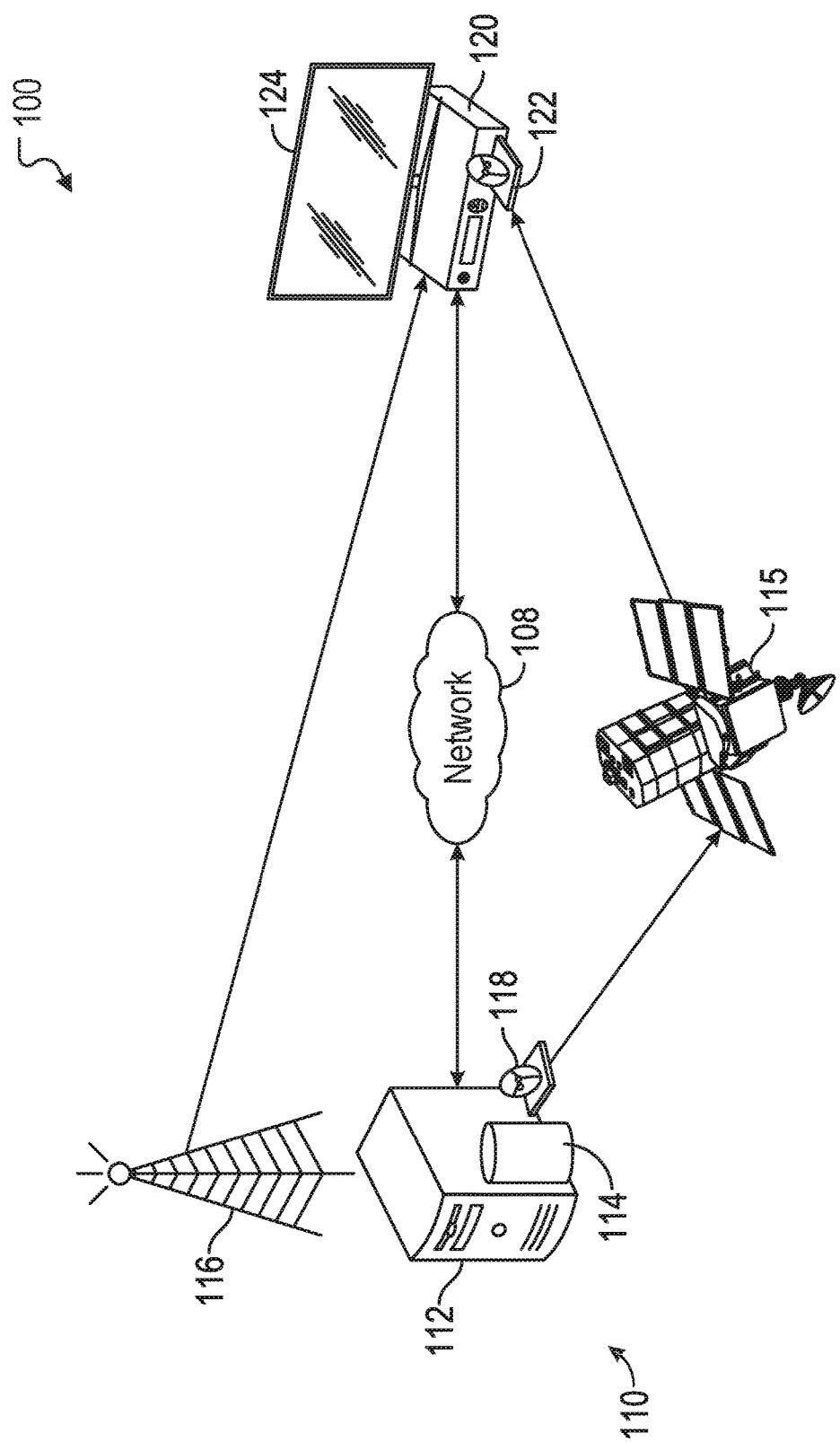
FIG. 1 illustrates an example network environment in which a video coding system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subj ect technology.

Legacy systems include SDR systems and typically store pixels for their displayable buffers in memory with 8-bits per component. Three components (red (R), green (G) and blue (B)) are typically stored along with a term called alpha (A), which is used to control the strength of blending between layers of rendered graphics. In some implementations, these components, namely R, G, B and A, may generally be referred together as "RGBA." A typical RGBA pixel may fit into a 32-bit memory location. This is a convenient number of bits that fits (or packs) well with the organization of memory in traditional central processing unit (CPU) and graphics processing unit (GPU) systems. In this respect, any multiple of 32 bits can pack well. In some aspects, pixel data having 64 bits (or some other multiple) may be the most efficient use of memory, such as dynamic random access memory (DRAM). In this example, two pixels (i.e. 2*32 bits=64 bits) would be handled as a single data unit. In some aspects, the term "buffer" generally refers to a DRAM buffer located off-chip.

The traditional memory organization can also be said to be efficient. All 32 bits in the packed RGBA pixel can contain useful and valid information. The traditional memory organization can also be said to offer easy random access. Since one pixel is contained within one 32-bit word, in order to access a particular pixel with a CPU or GPU, the address computation needed to access the 32-bit word is straightforward and efficient.

SDR graphics format using standard texture compression is efficient for memory random access, memory footprint and memory access bandwidth. For example, SDR graphics can be 8-bits per component, which amounts to 32 bpp (bits-per-pixel). An uncompressed 4×4 block of pixels can be packed to a 64-byte memory space. A 4x4 standard texture compressed block of pixels may be packed to a 32-byte memory space. The graphics pixel block that is packed in a number of bytes as power of two, such as 32 or 64-byte, can be easily addressed for read and write operations. However, graphics pixels or pixel blocks with bit depths higher than 8-bits per component may not be packed as efficiently for random access.

HDR systems allow a larger range in brightness (both brighter and darker) than SDR systems. HDR systems also allow a wider range in color gamut. In this respect, HDR systems can display a wider range of brightnesses and colors compared to SDR systems. As such, HDR pixels are not packed efficiently as SDR pixels. When representing pixels in an HDR system, a minimum of 10-bits per component for displayable buffers is required to provide generally acceptable picture quality. If fewer than 10-bits per component are used, the lack of bit-depth resolution of the components can lead to banding and other quantization artifacts on the display. As such, a pixel format that provides a minimum of 10-bits per component would need to be selected.

The subject technology provides for determining texture compression end points to allow an HDR pixel block with higher bit-depth components to be packed efficiently as similar to 8-bit standard texture compression. The compressed HDR graphics with high bit-depth components can still provide sufficient visual qualities with the following observations: 1) there are more smooth areas in HDR graphics of high bit-depth components and finer pixel resolution, such as 10-bit and 4K graphics, and 2) large transition areas can tolerate larger errors.

In one or more implementations, the subject technology provides for a graphics processor that includes an endpoint selection module to receive pixel data for a pixel block, obtain endpoints of a first bit length based on the pixel data in the pixel block, quantize the endpoints to a second bit length smaller than the first bit length, and select the quantized endpoints for pixel values in the pixel block. The graphics processor also includes a weight selection module to receive the pixel data for the pixel block, and determine a weight for each pixel of the pixel block in each of a plurality of planes corresponding to the endpoints selected for the pixel block. The graphics processor also includes a packing module to receive the endpoints for the pixel block and the weight for each pixel of the pixel block in each of the plurality of planes corresponding to the endpoints, and generate a compressed data block representative of the pixel block.

FIG. 1 illustrates an example network environment 100 in which a video coding system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a content delivery network (CDN) 110 that is communicably coupled to an electronic device 120, such as by a network 108. The CDN 110 may include, and/or may be communicably coupled to, a content server 112 for encoding and/or transmitting encoded data streams, such as high-efficiency video coding (HEVC) encoded video streams, AV1 encoded video streams, and/or H266 encoded video streams, over the network 108, an antenna 116 for transmitting encoded data streams over the air, and a satellite transmitting device 118 for transmitting encoded data streams to a satellite 115.

The electronic device 120 may include, and/or may be coupled to, a satellite receiving device 122, such as a satellite dish, that receives encoded data streams from the satellite 115. In one or more implementations, the electronic device 120 may further include an antenna for receiving encoded data streams, such as encoded video streams, over the air from the antenna 116 of the CDN 110. The content server 112 and/or the electronic device 120, may be, and/or may include, one or more components of the electronic system discussed below with respect to FIG. 2.

The network 108 may be a public communication network (such as the Internet, cellular data network, dialup modems over a telephone network) or a private communications network (such as private local area network ("LAN"), leased lines). The network 108 may also include, but is not limited to, any one or more of the following network topologies, including a bus network, a star network, a ring network, a mesh network, a star-bus network, a tree or hierarchical network, and the like. In one or more implementations, the network 108 may include transmission lines, such as coaxial transmission lines, fiber optic transmission lines, or generally any transmission lines, that communicatively couple the content server 112 and the electronic device 120.

The content server 112 may include, or may be coupled to, one or more processing devices, a data store 114, an encoder and/or a compression device. The one or more processing devices execute computer instructions stored in the data store 114, for example, to implement a content delivery network. The data store 114 may store the computer instructions on a non-transitory computer-readable medium. The data store 114 may further store one or more programs, e.g. video and/or audio streams, that are delivered by the CDN 110. The encoder may use a codec to encode video streams, such as an HEVC codec, an AV1 codec, an H266 codec, or any other suitable codec. In one or more implementations, the encoder may implement one or more of the encoding, compression, and/or storage techniques.

In one or more implementations, the content server 112 may be a single computing device such as a computer server. Alternatively, the content server 112 may represent multiple computing devices that are working together to perform the actions of a server computer (such as a cloud of computers and/or a distributed system). The content server 112 may be coupled with various databases, storage services, or other computing devices that may be collocated with the content server 112 or may be disparately located from the content server 112.

The electronic device 120 may include, or may be coupled to, one or more processing devices, a memory, and/or a decoder, such as a hardware decoder. The electronic device 120 may be any device that is capable of decoding and/or decompression an encoded data stream, such as an encoded video stream. In one or more implementations, the decoder may implement one or more of the decoding, decompression, and/or storage techniques.

For example, when pixels and/or pixel components are written to memory, such as by a video processing engine, a group of pixels may be handled together in order to utilize the statistical redundancy within those pixels. In one or more implementations, the memory may be DRAM and may correspond to, for example, one or more graphical frame buffers. In one or more implementations, a targeted number of bits may be used to represent the group of pixels. The targeted number of bits may be, for example, more than, less than, or equal to the original number of bits corresponding to the group of pixels.

In one or more implementations, the electronic device 120 may be, or may include all or part of, a laptop or desktop computer, a smartphone, a tablet device, a wearable electronic device, such as a pair of glasses or a watch with one or more processors coupled thereto and/or embedded therein, a set-top box, a television or other display with one or more processors coupled thereto and/or embedded therein, or other appropriate electronic devices that can be used to decode an encoded data stream, such as an encoded video stream.

In FIG. 1, the electronic device 120 is depicted as a set-top box, e.g. a device that is coupled to, and is capable of displaying video content on, a display 124, such as a television, a monitor, or any device capable of displaying video content. In one or more implementations, the electronic device 120 may be integrated into the display 124 and/or the display 124 may be capable of outputting audio content in addition to video content. The electronic device 120 may receive streams from the CDN 110, such as encoded data streams, that include content items, such as television programs, movies, or generally any content items. The electronic device 120 may receive the encoded data streams from the CDN 110 via the antenna 116, via the network 108, and/or via the satellite 115, and decode the encoded data streams, e.g. using the hardware decoder.

Figure 2:
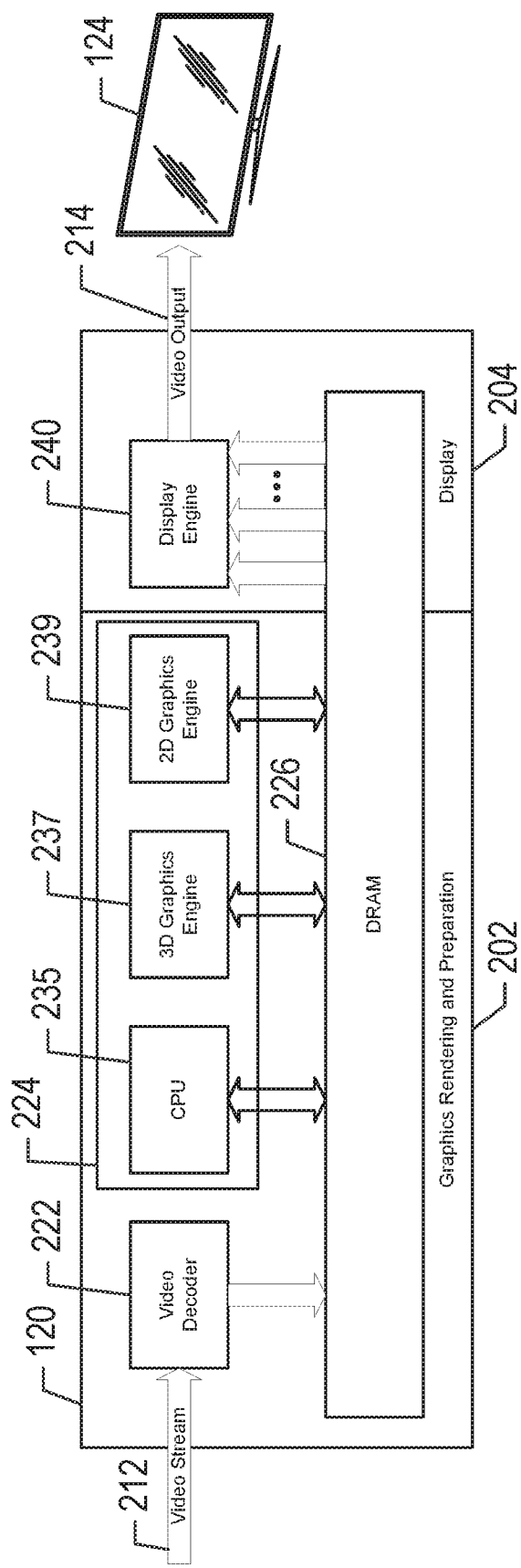
FIG. 2 illustrates an example electronic device implementing a graphics system for pixel storage in graphical frame buffers in accordance with one or more implementations.

FIG. 2 illustrates an example electronic device 120 implementing a graphics system for pixel storage in graphical frame buffers in accordance with one or more implementations. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The electronic device 120 includes a graphics rendering and preparation section 202 and a display section 204. The graphics rendering and preparation section 202 can include one or more decoders 222 (depicted as "video decoder"), a processing unit block 224, and a memory 226. The display section 204 can include a display engine block 240. In one or more implementations, the memory 226 can be, or can include, DRAM. In one or more implementations, the processing unit block 224 includes one or more central processing unit blocks 235 (depicted as "CPU"), a three-dimensional (3D) graphics engine block 237, and a two-dimensional (2D) graphics engine block 239. Each of the one or more CPU blocks 235, 3D graphics engine block 237, and 2D graphics engine block 239 can individually access the memory 226, and read and write pixel data to/from the memory 226. In one or more implementations, each of the CPU blocks 235, 3D graphics engine blocks 237, and/or 2D graphics engine blocks 239 may be any device that is capable of decoding and/or decompressing an encoded data stream, such as an encoded video stream, and capable of encoding and/or compressing a decoded data stream, such as a decoded video stream. In one or more implementations, the processing unit block 224 can include one or more MPEG feeder modules, one or more scaler modules, or generally any image processing blocks or modules.

In operation, the decoder 222 can receive one or more video streams, e.g. from one or more AV stream sources. For example, the decoder 222 may receive an incoming video stream signal 212. The incoming video stream signal 212 may flow as compressed digital data or digitized baseband analog video. The decoder 222 can decompress and decode the incoming video stream signal 212 and buffer still frame images of the video stream in the memory 226. The decoder 222 may generate decodable streams based on the incoming video stream signal 212. The decoder 222 may retrieve the decodable streams from the memory 226, decode them and re-store them in the memory 226. In some aspects, the memory 226 may be controlled by a memory control module (not shown). In one or more implementations, the incoming video stream signal 212 can include video streams that are already in a decoded format, e.g. a video stream received from a Blu-ray player, and the decoder 222 can be bypassed.

Multiple processing blocks (e.g., CPU block 235, 3D graphics engine block 237, 2D graphics engine block 239) read and write pixel data from/to the memory 226. Each of the processing blocks can render pixels and the output pixels of one block may be subsequently input to another in order to process further, such as blending multiple planes into a single composited graphics buffer (not shown). In some implementations, at least one of the processing blocks 224 may then operate on the decoded streams. The processing unit blocks 224 may perform image processing on the still frame images of the video streams, e.g. scaling, etc., and provide the processed frames to the display engine block 240. For example, the CPU block 235 can apply scaling and compose frames. In other examples, either of the 3D graphics engine block 237 and/or the 2D graphics engine block 239 can combine graphics or additional video with the incoming video stream signal 212. The resulting stream may be then sent to one or more video encoders (not shown) for display through suitable output interfaces, such as video output interface 214.

Each of the processing blocks 224 may obtain uncompressed pixel data output from other processing blocks, such as the CPU 235, 3D graphics engine block 237, or 2D graphics engine block 239 via the memory 226. The processing blocks 224 may process the incoming video stream signal 212 based on the input format and output format of the signal, and any appropriate system requirements. The incoming video stream signal 212 may be scaled and converted to the output display format directly, or go through single and multiple capture and playback loops via the 3D/2D engine blocks 235, 237. Each capture and playback loop may involve data processing, such as DNR, MAD-IT, or scaling, among others. The memory 226 may include a series of graphical frame buffers, such as displayable buffers, which allow an unlimited number of graphics layers to be composited and blended together before being displayed. The display engine 240 can read a number of prepared graphical frame buffers in parallel and perform final blending for display. An example process of decoding the compressed pixels and storing the uncompressed pixels in memory is discussed further below with respect to FIG. 5A.

Once the graphical frame buffers are available, they can be combined with the video using a compositor. The compositor may allow up to two video surfaces to be combined with data stored in a graphical frame-buffer. In some implementations, the blending order of any surface may be controlled by a computer-implemented process. The processing unit blocks 224 receive the still frame images and determine the pixels of the still frame images that will be visible, e.g. not occluded, in a composite image.

In one or more implementations, when the images are to be composited into a composite image, the processing unit blocks 224 and/or the display engine block 240 can receive position information items and layer indications for each of the still frame images, e.g. from the application layer. For example, the processing unit blocks 224 and/or the display engine block 240 can be communicatively coupled to a host processor (not shown) of the electronic device 120 and the host processor can provide the position information items and/or the layer indications to the processing unit blocks 224 and/or the display engine block 240.

During video processing, any graphics or additional video are combined immediately before being displayed, and the manipulated video is then sent to one or more video encoders (not shown) for display, through the video output interface 214. Each of the processing unit blocks 224 may include an encoder that encodes, e.g. compresses, the pixels of the images that will be visible in the composite image, which can be referred to as the visible pixels of the images, and stores the compressed visible pixels in the graphical frame buffers of the memory 226. The capture block 239 then determines a location, e.g. an address, in the memory 226 to write the compressed pixels of each of the images, e.g. based at least on the position information for each of the images, and writes the compressed pixels to the determined locations of the memory 226.

The graphics system may generate rendered graphics in one or more of the 3D graphics engine block 237 or the 2D graphics engine block 239 in response to a request to display rendered graphics. Examples of requests to display rendered graphics may include activating a menu, changing a channel, browsing a channel guide, displaying a photo or video, and other requests that may result in the display of rendered graphics. In response to a request to render graphics, the graphics system may first determine the colorspace and nonlinear space that the will be used to render the graphics. The decision to render the graphics in a particular colorspace or nonlinear space may depend on multiple performance parameters that may correspond to the capacity of the various components of the graphics system and/or other parameters of components external to the graphics system.

Upon completion of rendering the graphics, the processing unit blocks 224 and/or the display engine block 240 may perform various colorspace conversions or nonlinear space conversions to the rendered graphics. The converted graphics may then be combined with the still frame images and video in the compositor to generate a blended video output. For example, the compositor may receive the still frame images of the video stream to add additional rendered graphics and enhancement information to each still frame image. The blended video output may be provided to a post processor (not shown). The post processor may perform colorspace conversions or nonlinear conversions to the blended video to generate a converted output.

The display engine block 240 can generate the composite image in an on-chip display buffer (not shown) and can provide the composite image to the output device 124, e.g. for display. The composite image including combined video frames and graphics may be output to a display by the video output interface 214 relevant to the particular application of the graphics scaling system or display device. The video output interface 214 may include an HDMI graphics connection, component video, A/V, composite, co-axial, or any other connection compatible with a particular video display.

The display engine block 240 may provide output signals in any suitable format. For example, the display engine block 240 may provide HD/SD, ITU-R-656 TTX, HDMI or any other suitable format. In some implementations, the display engine block 240 includes a video encoder that supports the following output standards: NTSC-M, NTSC-J, PAL-BDGHIN, PAL-M, PAL-Nc, and SECAM. In some implementations, the following output formats are additionally supported: composite, S-video, SCART1, SCART2, RGB and YPrPb component, and the display engine block 240 may support output resolutions of 480i, 480p, 576i, 576p, 720p, 1080i, 1080p, 2K, ultra-high definition (UHD), 4K, 8k, among others. In some implementations, high quality video and graphics processing are integrated into an integrated circuit die, featuring 2D/3D graphics processing while still maintaining efficient use of memory bandwidth.

In one or more implementations, the decoder 222, the processing unit block 224, and/or the display engine block 240 can be implemented in software (e.g., subroutines and code). In one or more implementations, the decoder 222, the processing unit block 224, and/or the display engine block 240 can be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
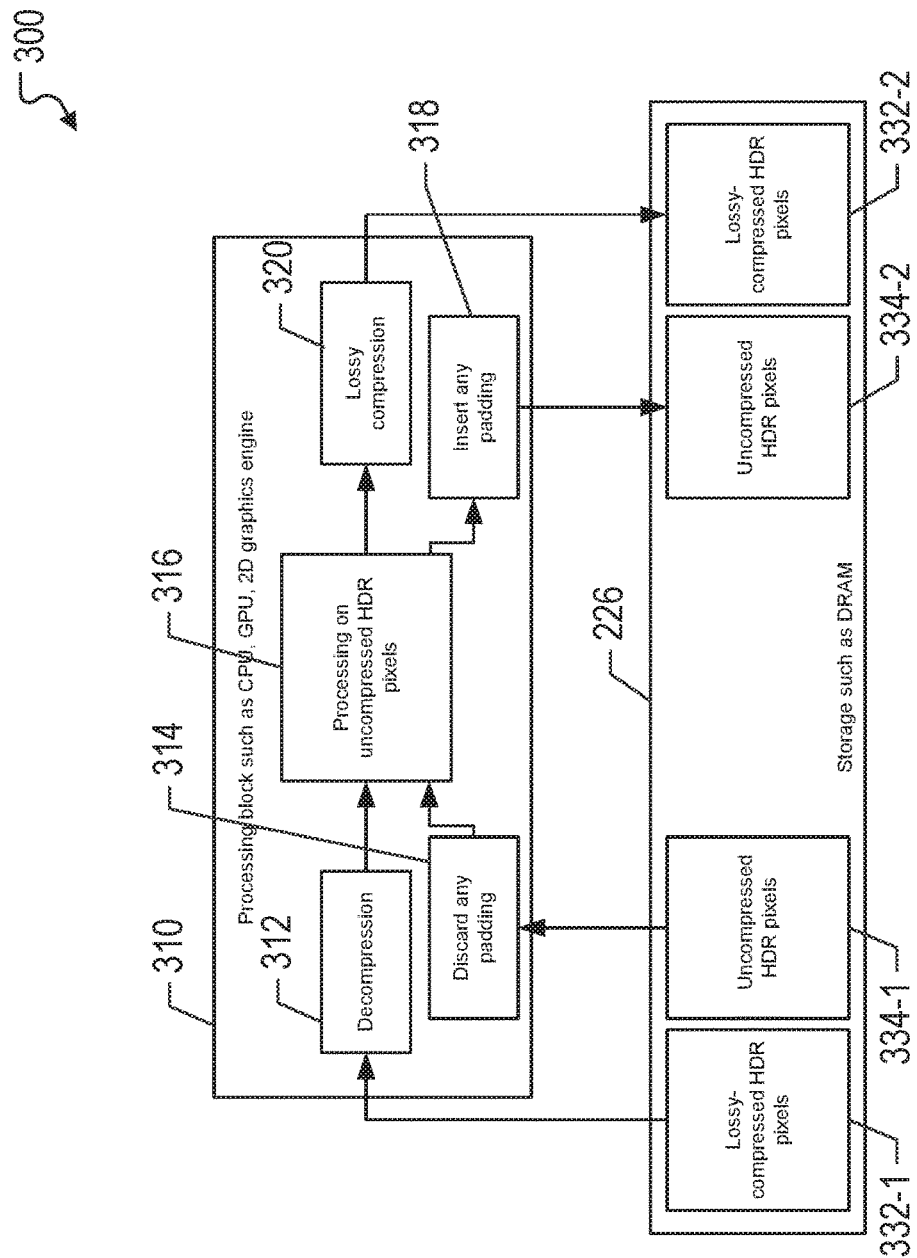
FIG. 3 illustrates a dataflow for an example graphics system for pixel storage in graphical frame buffers in accordance with one or more implementations.

FIG. 3 illustrates a dataflow for an example graphics system 300 for pixel storage in graphical frame buffers in accordance with one or more implementations. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The graphics system 300 includes a processing block 310 and the memory 226. The processing block 310 includes a decompression block 312, a padding discard block 314, a processing unit core 316, a lossy compression block 320, and a padding insertion block 318. In one or more implementations, each of the CPU blocks 235, 3D graphics engine block 237 and 2D graphics engine block 239 may be, or include at least a portion of, the processing block 310. The memory 226 includes graphical frame buffers 332-1 and 332-2 for storing lossy-compressed HDR pixel data, and includes graphical frame buffers 334-1 and 334-2 for storing uncompressed HDR pixel data. The decompression block 312 includes an input interface with the graphical frame buffer 332-1 for obtaining the lossy compressed HDR pixel data from storage. The lossy compression block 320 includes an output interface to the graphical frame buffer 332-2 for storing the lossy compressed HDR pixel data. The padding discard block 314 has an input interface with the graphical frame buffer 334-1 to receive the uncompressed HDR pixel data and remove (or discard) any padding from the pixel data frame. The padding insertion block 318 has an output interface with the graphical frame buffer 334-2 to store pixel data frames containing padding inserted with the uncompressed HDR pixel data. Each of the decompression block 312 and the padding discard block 314 has a respective output interface to the processing unit core 316 for processing on the uncompressed HDR pixel data. Each of the lossy compression block 320 and the padding insertion block 318 has a respective input interface with the processing unit core 316 to receive the processed uncompressed HDR pixel data for storing the respective HDR pixel data into the memory 226.

In operation, the processing block 310 retrieves bytes of compressed visible pixels, such as the lossy compressed HDR pixel data, from the graphical frame buffer 332-1 of the memory 226, determines the image that corresponds to the compressed visible pixels, e.g. based at least on the position information and the memory address from which the bytes were retrieved from the memory 226, and may store the compressed visible pixels in another graphical frame buffer in the memory 226 associated with the determined image, such as the graphical frame buffer 332-2. The processing block 310 can generate a composite image, e.g. line-by-line, by retrieving the appropriate compressed visible pixels from the appropriate graphical frame buffers 332-1, e.g. based at least on the position information and the layer indications, and decoding, e.g. decompressing, the compressed HDR pixel data using a local decoder, such as the decompression block 312.

In one or more implementations, the subject technology provides for a lossy compression method of storing HDR pixel data in graphics systems by determining texture compression end points to allow an HDR pixel block with higher bit-depth components to be packed efficiently as similar to 8-bit standard texture compression. In this respect, the end points of high bit-depth pixel components can be quantized to a lesser number of bits, such that a final compressed block size can still fit in a certain byte size for random access. For example, in 10-bit RGB components, the minimum and maximum end points can be quantized to 8-bit endpoints when a pixel block (e.g., 4 pixels by 4 pixels, or 16 pixels) is compressed.

As illustrated in FIG. 3, the dataflow within the graphics system 300 involves the processing block 310 reading and writing compressed or uncompressed HDR pixels. The processing block 310 may support all combinations of input and/or output being compressed/uncompressed depending on system requirements. While uncompressed HDR pixel data may be stored in the memory 226 with padding, the processing block 310 can discard the padding for internal processing. Also, the lossy compression block 320 can compress the real data since any future decompression of this data can reinsert the padding (typically 0's) at output time.

In one or more implementations, the processing block 310 can store pixels in the displayable graphical frame buffers of the memory 226 using 10-bits, 12-bits or more, for each of the R, G, B and A components internally in the graphics system 300. However, when the pixel data is written to the memory 226, a group of pixels (e.g. 4 pixels by 4 pixels for a total of 16 pixels) are handled together in order to utilize the statistical redundancy within those pixels. But critically compared to the lossless compression case above, a targeted number of bits are used, which may be smaller than the original number of bits, to represent the group of pixels. In some implementations, the targeted number of bits is more than needed to represent the group of pixels. In this case, however, the bits needed are padded to meet the targeted number of bits, and therefore, the random access properties required can be maintained. If more than the targeted number of bits is required to represent the group of pixels, the number of bits used is limited to the targeted number of bits. In some aspects, a subset of the information is discarded, and the processing block 310 attempts to discard information that is not visually significant. As compared to the lossless compression algorithm, which can produce mathematically-identical original and subsequently decompressed compressed-buffers, the lossy compression algorithm can provide visually (but not mathematically identical) lossless compression.

In some implementations, the targeted number of bits can be a power of two value (e.g., 32, 64, 128, etc.), and based on a compression ratio. If the targeted number of bits is too small, the compression ratio may be too high, and thus, detrimental to the visual quality. The subject technology provides for determining the proper targeted number of bits to achieve sufficient visual quality. In one or more implementations, the targeted number of bits is based on a multiple of the DRAM burst size. For example, the DRAM burst size may be referred to as a burst length used in transmitting data to the memory 226.

The compression ratio may be the actual number of bits per the targeted number of bits. The state of art for compression ratios is about 10:1, but the ratio value may vary depending on implementation. Because the subject system is configured to process a small block (e.g., 4×4 pixel block), and the image processing is performed relatively in real-time, the objective of the subject system may be more conservative at 2:1, compared to the state of the art at 10:1. Effectively, compression ratios of 10:1, for example, may not be feasible with such a relatively small number of pixels to process, because there is not enough redundancy in those pixels to utilize the compression effectively.

Figure 4:
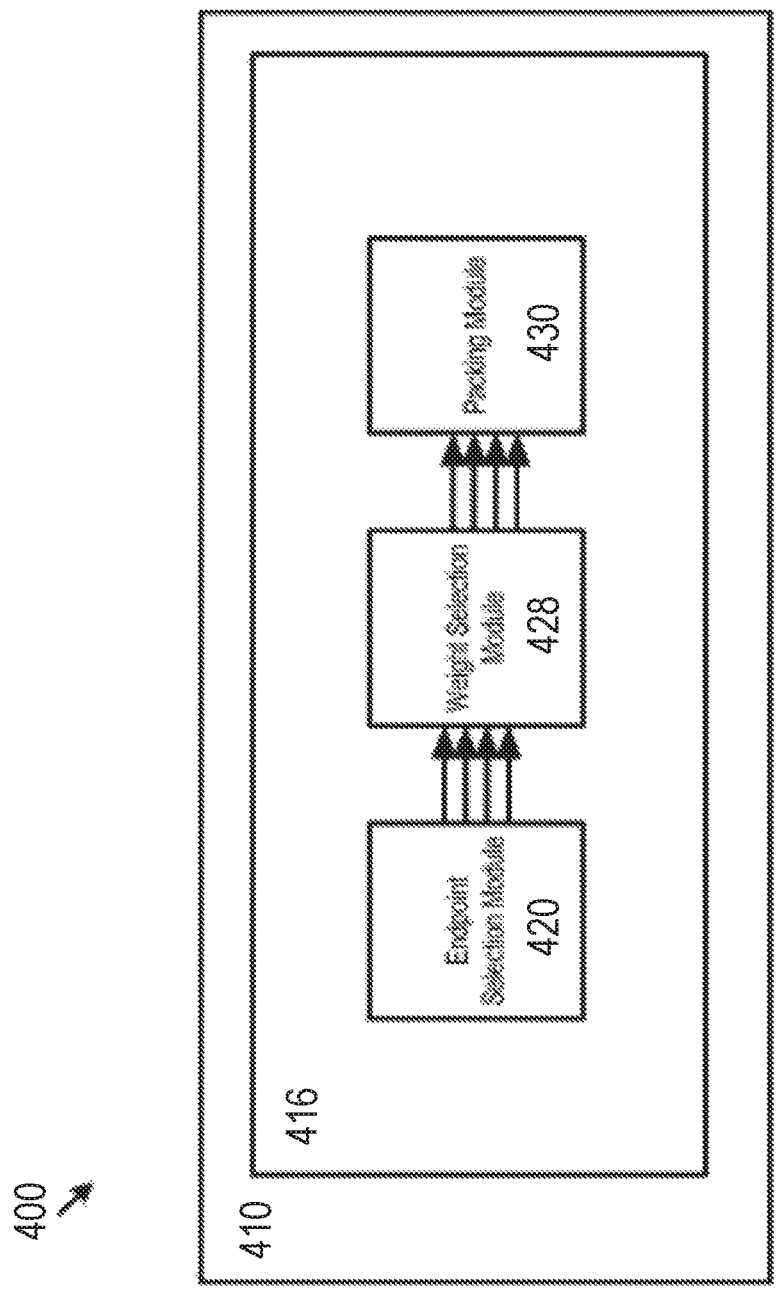
FIG. 4 is a block diagram illustrating a system for processing graphics in accordance with one or more implementations.

FIG. 4 illustrates a block diagram of an example system 400 that includes a graphics processor 410. Not all of the depicted components can be used, however, and one or more implementations can include additional components not shown in the figure. Variations in the arrangement and type of the components can be made without departing from the spirit or scope of the claims as set forth herein. Additional components, different components, or fewer components can be provided.

The graphics processor 410 may include a graphics compression module 416 that receives graphics to be compressed. The graphics may include various types of graphics. Some of the graphics may be static graphics such as text, menus, and illustrations. Some of the graphics may be dynamic graphics and may include, for example, video. In one or more implementations, the system 400 is, or includes at least a portion of, the processing block 310 of FIG. 3. In one or more implementations, the graphics processor 410 is, or includes at least a portion of, the processing unit core 316 of FIG. 3. In one or more implementations, the graphics compression module 416 is, or includes at least a portion of, the lossy compression block 320 of FIG. 3.

The compression module 416 may process the graphics in a multi-plane space. As used herein, the term "planes" generally refer to a set of color components. For example, the graphics may be represented in a three plane space such as a red plane, a green plane, and a blue-alpha plane (R/G/BA). The blue-alpha plane (BA) may be where one or more bits may be reserved to express alpha and the rest of the bits are allocated to represent blue. The alpha channel may, for example, be used to represent opacity. In some aspects, the R/G/BA plane may be referred to as a 3-plane mode. In other scenarios, the graphics may be represented in separate planes (e.g. a red plane, a green plane, a blue plane, and an alpha plane, also denoted R/G/B/A) where the bits are distributed to the separate planes. In some aspects, the R/G/B/A plane may be referred to as a 4-plane mode. In one or more implementations, the graphics may be represented as an LMS (Long-Medium-Short-Wavelength) color space that is similar to RGB, of which either can be used for HDR coding. The LMS color space is named for a color space represented by the response of three type of cones of the human eye for long, medium and short wavelengths. The subject system can utilize LMSA planes in the same way as RGBA planes. As such, with regard to the graphics compression module 416, the modules may process three, four, or any "n" number of planes in representing the values of the pixel block. In some implementations, each pixel block may use a different set of planes.

Each plane may define two endpoints. The endpoints may represent the minimum and maximum values in the plane. In this respect, pixel values may be interpolated between endpoints for each plane. Interpolation coefficients may be referred to as "weights."

The compression module 416 may include an endpoint selection module 420. The endpoint selection module 420 may be operable to receive pixel data for a pixel block and determine endpoints for the values of the pixels in the pixel block. The pixel blocks may be square blocks, for example 4×4, 8×8, or 16×16 pixels. The pixel blocks may also be non-square blocks. For example, pixel blocks may have more pixels along the direction that corresponds with the raster direction, such as the horizontal direction in most systems, than along the non-raster direction. This would allow the system to process the data more closely with raster order which may be beneficial when processing information that is typically processed in raster order, for example video. In some examples, the pixel blocks may even have a width of a single pixel along the non-raster direction, for example a line of pixels extending along the raster direction. Accordingly, in some systems the pixel blocks may be 8×2 or 16×1 pixels.

The endpoint selection module 420 may code the endpoints with 8-bit RGB components and 6-bit Alpha component in some implementations, or may code the endpoints with 10-bit RGBA components in other implementations. When RGB endpoints cover most of the available range (e.g., 0-255), the values [0,255] may be used as the endpoints for efficiency, and any additional bits may be used as weights. In some implementations, each plane, except Alpha, has a 1-bit field to indicate maximum range endpoints.

The endpoint selection module 420 may quantize the endpoints of a high bit-depth pixel component to a lesser number of bits such that the final compressed block size can still fit in a certain byte size for random access. For example, the endpoint selection module 420 may quantize 10-bit RGB component min/max endpoints to 8-bit min/max endpoints when a block of 16 pixels is compressed.

In some implementations, the quantization of the endpoints for 10-bit RGB components may include a bitwise operation such as a right bit shift, where the bits are shifted to the right. In some aspects, the term "MIN-MAX" can refer to either the minimum endpoint or maximum endpoint for a component in a pixel block. For example, the quantization of a 10-bit RGB component min/max endpoint to 8-bit min/max endpoints may include shifting the endpoint bit positions to the right by two, after decompression. The number of bit positions shifted may vary depending on implementation. The quantization operation can be expressed as:

$$\text{MIN-MAX} = \text{MIN-MAX} \gg 2 \qquad \text{Eq. (1)}.$$

In another example, 8-bit endpoints can be unquantized to 10-bits when a pixel block is decompressed. In some implementations, the unquantization of the endpoints for 10-bit RGB components may include a bitwise operation such as a left bit shift, where the bits are shifted to the left. For example, an 8-bit RGB component min/max endpoint can be converted to 10-bit min/max endpoints by shifting the minimum endpoint bit positions to the left by two, and shifting the maximum endpoint bit positions to the left by two and adding a value of three (3), before decompression. The unquantization operation can be expressed as:

$$\text{MIN} = \text{MIN} \ll 2 \qquad \text{Eq. (2)}.$$

$$\text{MAX} = \text{MAX} \ll 2 + 3 \qquad \text{Eq. (3)}.$$

In some implementations, Alpha endpoints are quantized to 6-bits, covering the full range 0-255. The Alpha endpoint may be quantized from 8-bits to a lesser number of bits in some implementations, or quantized from 10-bits to the lesser number of bits in other implementations. In some implementations, the Alpha endpoints (e.g., 8-bit or 10-bit Alpha) may be quantized differently between the 4-plane mode and the 3-plane mode.

In the 4-plane mode, visible alpha banding in smooth background video/graphics may occur with smooth alpha variation since both minimum and maximum endpoints are mostly quantized to 6-bit values with some quantized to 4-bit and 5-bit values formed between consecutive pixel blocks.

In some implementations, a pixel block may include a quantization select indicator associated with the Alpha endpoint to select a type of alpha quantization depending on the type of plane mode (e.g., 3-plane mode or 4-plane mode). When the quantization select indicator applies to the 4-plane mode, the minimum difference between the minimum and maximum endpoints is a value of seven (7) after unquantization between the minimum and maximum endpoints. The unquantized samples are interpolated using 3-bit weights between the minimum and maximum endpoints. The interpolation between quantized end points can restore and smoothens samples within the pixel block and between the pixel blocks, and minimizes the visible alpha banding. When the quantization select indicator applies to the 3-plane mode, the weights may be derived based on the B component, although a minimal amount of alpha banding may occur depending on foreground graphics. In 3-plane mode, the Alpha component is either a constant value or varies largely with the B component. The alpha banding may not be visible, since foreground graphics are typically not smooth when the 3-plane mode is selected. In some aspects, if the Alpha component is a constant value within a pixel block, no alpha banding occurs.

In some implementations, the 10-bit Alpha endpoints may be quantized to either 7-bit or 6-bit min/max endpoints based on at least the MIN/MAX difference signaled by a quantization bit-depth indicator. The MIN/MAX alpha endpoints may be further encoded in 11-bit base/offset values, where the base value is either the 6-bit or 7-bit value and the remainder is respectively 5-bit or 4-bit offset values. In this respect, the base value may be represented with the minimum or maximum value, and the offset value may be represented as some form of remainder of the MIN-MAX value. If the 7-bit MIN/MAX difference is small, such as less than a value of 16, and the quantization bit-depth indicator is a value of one, the Alpha endpoint is quantized to the 7-bit value, where the base value includes the 7-bit minimum value and the offset value includes the 4-bit difference between the minimum and maximum values. In this respect, the quantization of a 10-bit Alpha component min/max endpoint to 7-bit Alpha min/max endpoints may include shifting the endpoint bit positions to the right by three. The quantization operation can be expressed as:

$$\text{MIN-MAX} = \text{MIN-MAX} \gg 3 \qquad \text{Eq. (4)}.$$

Alternatively, the quantization of a 10-bit Alpha component min/max endpoint to 7-bit Alpha min/max endpoints may be expressed as follows:

$$\text{MIN-MAX} = \text{MIN-MAX} * 127 \qquad \text{Eq. (5)}.$$

$$\text{MIN-MAX} = (\text{MIN-MAX} + 512)/1024 \qquad \text{Eq. (6)}.$$

If the 7-bit MIN/MAX difference is larger, such as equal to or more than a value of 16, and the quantization bit-depth indicator is a value of zero, the Alpha endpoint is quantized to the 6-bit value, where the base value includes a 6-bit base value and the offset value includes a 5-bit value. If the difference between (6-bit) MAX and MIN is less than 32, the base value is the 6-bit minimum value (MIN) and the offset is the difference of (MAX−MIN). Otherwise, the base value is the maximum value and the offset value is the remainder of (63−MAX+MIN). In this respect, the quantization of a 10-bit Alpha component min/max endpoint to 6-bit Alpha min/max endpoints may include shifting the endpoint bit positions to the right by four. The quantization operation can be expressed as:

$$\text{MIN-MAX} = \text{MIN-MAX} \gg 4 \qquad \text{Eq. (7)}.$$

Alternatively, the quantization of a 10-bit Alpha component min/max endpoint to 6-bit Alpha min/max endpoints may be expressed as follows:

$$\text{MIN-MAX} = \text{MIN-MAX} * 63 \qquad \text{Eq. (8).}$$

$$\text{MIN-MAX} = (\text{MIN-MAX} + 512)/1024 \qquad \text{Eq. (9).}$$

In some implementations, the unquantization of the endpoints for 10-bit Alpha component may include a bitwise operation such as a left bit shift, where the bits are shifted to the left. For example, a 7-bit Alpha min/max endpoint can be converted to 10-bit Alpha min/max endpoints by shifting the minimum endpoint bit positions to the left by three, and shifting the maximum endpoint bit positions to the left by three and adding a value of seven (7), before compression. The unquantization operation can be expressed as:

$$\text{MIN} = \text{MIN} << 3 \qquad \text{Eq. (10).}$$

$$\text{MAX} = \text{MAX} << 3 + 7 \qquad \text{Eq. (11).}$$

In some implementations, a 6-bit Alpha min/max endpoint can be converted to 10-bit Alpha min/max endpoints by shifting the minimum endpoint bit positions to the left by four, and shifting the maximum endpoint bit positions to the left by four and adding a value of fifteen (15), before compression. The unquantization operation can be expressed as:

$$\text{MIN} = \text{MIN} << 4 \qquad \text{Eq. (12).}$$

$$\text{MAX} = \text{MAX} << 4 + 15 \qquad \text{Eq. (13).}$$

Referring again to FIG. 4, the endpoint selection module 420 may select endpoints for each plane. The endpoint selection module 420 includes end points of a block for each pixel component and performs a process to select end points. In one or more implementations, the values of the pixels in the pixel block can be evaluated to determine if the values exceed a value threshold. Then, the number of pixels that exceed the value threshold are evaluated to determine if the number of pixels exceed a pixel count threshold. The endpoints may be set to a default value in response to the number of pixels exceeding the pixel count threshold. The default value for the endpoints include a maximum pixel value and a minimum pixel value. For example, the minimum pixel value may be 0 and the maximum pixel value may be 255 for a 10-bit pixel value. In one example, a simple threshold may be used to select the maximum range endpoints. For example, 10-bit maximum range endpoints may be selected when: [1] the range (largest pixel value in the pixel block−smallest pixel value in the pixel block) exceeds a threshold (for example 560=140*4.) and [2] the number of values "close" (e.g. within 12=3*4) to maximum pixel value or the smallest pixel value is less than a count threshold (for example 9.) Accordingly, the bits typically used to express the endpoints can be allocated to the values by expanding the number of bits allocated to the weight for each pixel of the pixel block.

In some implementations, the MIN/MAX may be encoded directly in two 8-bit MIN/MAX endpoints in the 3-plane mode (e.g., R/G/BA). In the 3-plane mode, the R and G components are directly coded in 16-bit (8-bit each) MIN−MAX endpoints, whereas the B component in 3-plane AB mode is encoded to an 8-bit base and 7-bit offset (for 15-bits total).

As used herein, the term "correlated MIN−MAX" refers to either the minimum endpoint or maximum endpoint for B component in a pixel block, which may be selected based on the Alpha MIN−MAX component position within the pixel block, instead of the minimum and maximum values of the B component. As a result, the minimum value may be larger than the maximum value. In this respect, the minimum and maximum values are swapped to encode the base and offset values. As such, the extra bit gained from 15-bit base-off coding may be used to indicate the order reversal of correlated MIN−MAX pixels or alpha in the AB components in 3-plane mode.

In one or more implementations, the MIN/MAX may be encoded into two 8-bit endpoints in the 4-plane mode (R/G/B/A), where the MIN/MAX are further encoded to an 8-bit base and 7-bit offset (for 15-bits total). In some aspects, the extra bit gained from 15-bit base-off coding may be used for partial flat region (PFR) coding in the 4-plane mode.

The quantization of the endpoints enables reuse of 8-bit compression techniques, which leads to a 2.5× compression rate (e.g., 4×4 10-bit RGBA pixel block of 640-bits that is compressed to 256-bits). The quantization enables 10-bit components to utilize the same bandwidth as 8-bit compression, and a compressed block based on 8-bit compression conforms to existing interface requirements for DRAM accessing.

Once the endpoints are selected by the endpoint selection module 420, the selected endpoints may be communicated to a weight selection module 428. The weight selection module 428 may receive pixel data for the pixel block and determine a weight for each pixel of the pixel block. As such, a weight may be determined for each plane relative to the selected endpoints for each plane. The endpoints and the weights are provided to a packing module 430. The packing module 430 may receive the endpoints for the pixel block and the weight for each pixel of the pixel block corresponding to the endpoints. The packing module 430 generates compressed data representative of the pixel block based on the endpoints and the weights. For example, the endpoints for the pixel block may be communicated then each pixel value may be represented as a weighting relative to the endpoints. The endpoints and weighting may be determined and communicated for each plane thereby representing each corresponding component of the pixel value.

In some implementations, a pixel block may include visible bandings, where the MIN−MAX range is relatively large (e.g., greater than 72 for 10 bits-per-pixel), and a relatively large number of background pixels are considered smooth and flat. In this respect, 3-bit or 4-bit weights may not be enough. As such, an additional coding mode for a partial flat region in the pixel block is added to the compression framework.

If a region of flat pixels within a pixel block is detected, an average value of the flat pixels is coded instead of using individual weights. A partial flat region mode indicator may be added to select between an average value or individual weight, where a 10-bit average value is applied to flat region pixels and individual weights are applied to the remainder of pixels. In some implementations, the partial flat region mode designation applied to RGB channels in the 4-plane mode (e.g., R,G,B,A), however, the partial flat region mode designation may not apply to the Alpha plane and to any channel in the 3-plane mode (e.g., R,G,BA) to reduce encoding complexity.

Figure 5:
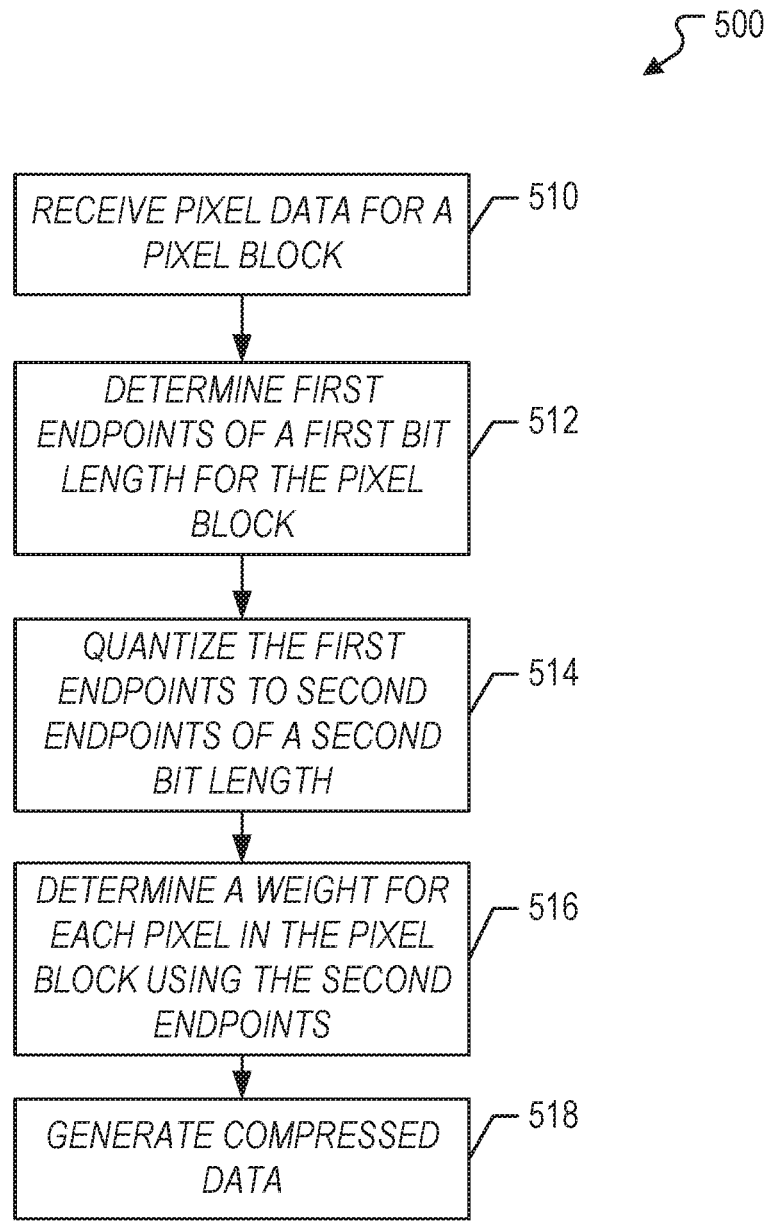
FIG. 5 is a flow chart of a method for processing graphics in accordance with one or more implementations.

FIG. 5 illustrates a flow diagram of an example process 500 for processing graphics in accordance with one or more implementations. For explanatory purposes, the example process 500 is primarily described herein with reference to the processing block 310 of FIG. 3; however, the example processes 500 is not limited to the processing block 310 of FIG. 3, and the example process 500 can be performed by one or more other components of the electronic device 120, such as the graphics processor 410. Further for explanatory purposes, the blocks of the example process 500 are described herein as occurring in serial, or linearly. However, multiple blocks of the example process 500 can occur in parallel. In addition, the blocks of the example process 500 can be performed a different order than the order shown and/or one or more of the blocks of the example process 500 are not performed.

The example process 500 may be carried out in a graphics processor that has been designed to carry out the steps discussed below. The method will be described as providing a four plane representation of the graphics; however, as discussed above a different number of planes may be used. The graphics processor may receive pixel data for a pixel block. (510). The first endpoints of a first bit length for the values of the pixels in the pixel block may be determined. (512). The first endpoints may be determined for each pixel block of the four planes (e.g., R,G,B,A). The first endpoints may be quantized into second endpoints of a second bit length. (514). For example, 10-bit RGB endpoints may be converted to 8-bit RGB endpoints, whereas 10-bit Alpha endpoints may be converted into 6-bit or 7-bit Alpha endpoints, depending on implementation. A weight for each pixel of the pixel block using the second endpoints may be determined. (516). The weight for each pixel of the pixel block may be determined in each of four planes corresponding to the second endpoints selected for the block by the endpoint selection module 420. A compressed data block may be generated. (516). The compressed data block may be representative of the pixel block in response to the endpoints for the pixel block and the weight for each pixel of the pixel block in each of the four planes corresponding to the endpoints.

Figure 6:
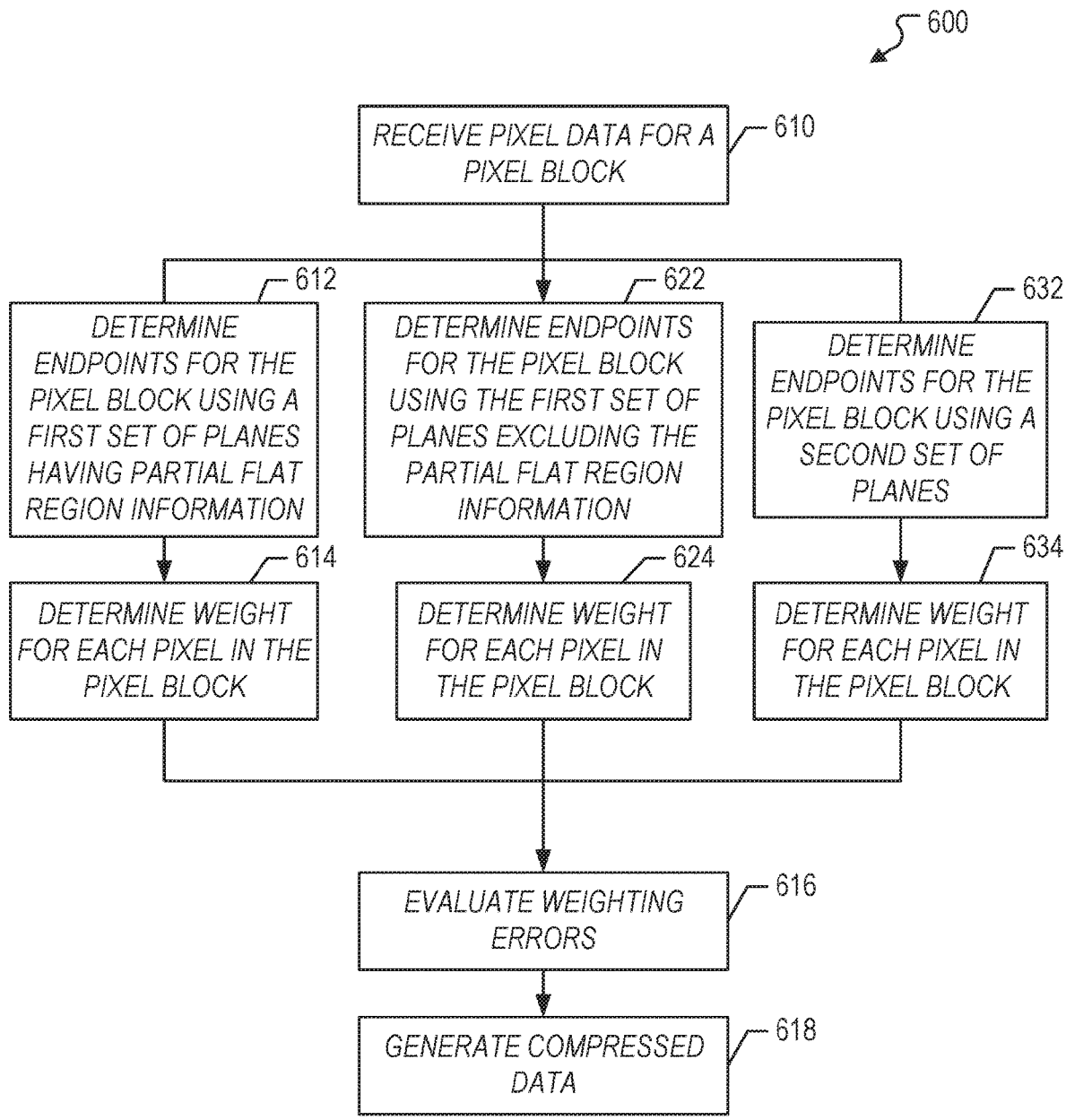
FIG. 6 is a flow chart of a method for processing graphics to select from two representations determined parallel in accordance with one or more implementations.

FIG. 6 is a flow chart illustrating a process 600 for processing graphics. For explanatory purposes, the example process 600 is primarily described herein with reference to the processing block 310 of FIG. 3; however, the example processes 600 is not limited to the processing block 310 of FIG. 3, and the example process 600 can be performed by one or more other components of the electronic device 120, such as the graphics processor 410. Further for explanatory purposes, the blocks of the example process 600 are described herein as occurring in serial, or linearly. However, multiple blocks of the example process 600 can occur in parallel. In addition, the blocks of the example process 600 can be performed a different order than the order shown and/or one or more of the blocks of the example process 600 are not performed.

The graphics processor 410 may receive pixel data for a pixel block and distribute the pixel data to be evaluated for compression relative to two different multi-plane spaces. (610). For example, a first branch may evaluate a four plane representation of the pixel data, while a second branch may evaluate a three plane representation of the pixel data. The endpoints for the values of the pixels in the pixel block using a first set of planes having partial flat region information may be determined. (612). The endpoints may be determined for the pixel block in each of the four planes. A weight for each pixel of the pixel block may be determined. (614). The weight for each pixel of the pixel block may be determined in each of four planes corresponding to the endpoints selected for the block by the endpoint selection module. (612). For example, a first branch may evaluate a four plane representation of the pixel data having partial flat region information, while a second branch may evaluate a four plane representation of the pixel data excluding the partial flat region information, and a third branch may evaluate a three plane representation of the pixel data.

In the first branch, the endpoints for the values of the pixels in the pixel block using a first set of planes having partial flat region information may be determined. (612). In this example, the pixel block may include an indicator for a partial flat region mode of the RGB components. The endpoints may be determined for the pixel block in each of the four planes. A weight for each non-flat region pixel of the pixel block may be determined. (614). The weight for each non-flat region pixel of the pixel block may be determined in each of four planes corresponding to the endpoints selected for the block by the endpoint selection module 420. (612). Given the indicator for the partial flat region mode of the RGB components, only the average value (e.g., 10-bit for 10-bit pixels or 8-bit for 8-bit pixels) of the flat region pixels is coded instead of individual weights. In this respect, the flat region pixels are coded with the average value and the remaining pixels (or non-flat region pixels) of the pixel block are coded with individual weights. The Alpha component is applied with individual weights irrespective of the indicator for the partial flat region mode.

In the second branch, the endpoints for the values of the pixels in the pixel block using the first set of planes excluding the partial flat region information may be determined. (622). The endpoints may be determined for the pixel block in each of the four planes. A weight for each pixel of the pixel block may be determined. (624). The weight for each pixel of the pixel block may be determined in each of four planes corresponding to the endpoints selected for the block by the endpoint selection module 420. (622).

In the third branch, the endpoints for the values of the pixels in the pixel block using a second set of planes may be determined. (632). The endpoints may be determined for the pixel block in each of the three planes. A weight for each pixel of the pixel block may be determined. (634). The weight for each pixel of the pixel block may be determined in each of three planes corresponding to the endpoints selected for the block by the endpoint selection module 420. (632).

The errors of the respective weightings may be evaluated. (616) An error of the weightings determined in the four plane representation having the partial flat region information may be compared with the error of the weightings determined in the four plane representation excluding the partial flat region information, and the error of the weightings determined in the three plane representation may be compared with the errors of the weightings determined in each of the four plane representations. A compressed data block may be generated. (618). If any of the four plane representations has less error than the three plane representation, the compressed data block may be provided with the endpoints for the pixel block and the weight for each pixel of the pixel block in the corresponding four plane representation. If the three plane representation has less error, the compressed data block may be provided with the endpoints for the pixel block and the weight for each pixel of the pixel block in the three plane representation.

Further, to accommodate dynamic graphics, the first branch, the second branch and the third branch may be calculated in parallel circuits and the steps in one branch may occur simultaneously with steps in the other branches on the same pixel data. As such, determining a weight for each pixel of the pixel block in each of the three planes and generating a compressed data block in response to the endpoints for the pixel block and the weight for each pixel of the pixel block in each of the three planes can occur in parallel with the determining a weight for each pixel of the pixel block in each of the four planes and the generating a compressed data block in response to the endpoints for the pixel block and the weight for each pixel of the pixel block in each of the four planes. Further, the determining the weight for each pixel of the pixel block in each of the three planes and the determining the weight for each pixel of the pixel block in each of the four planes may occur simultaneously. Similarly, the generating of the compressed data block in response to the endpoints for the pixel block and the weight for each pixel of the pixel block in each of the three planes and the generating the compressed data block in response to the endpoints for the pixel block and the weight for each pixel of the pixel block in each of the four planes occur simultaneously.

Figure 7:
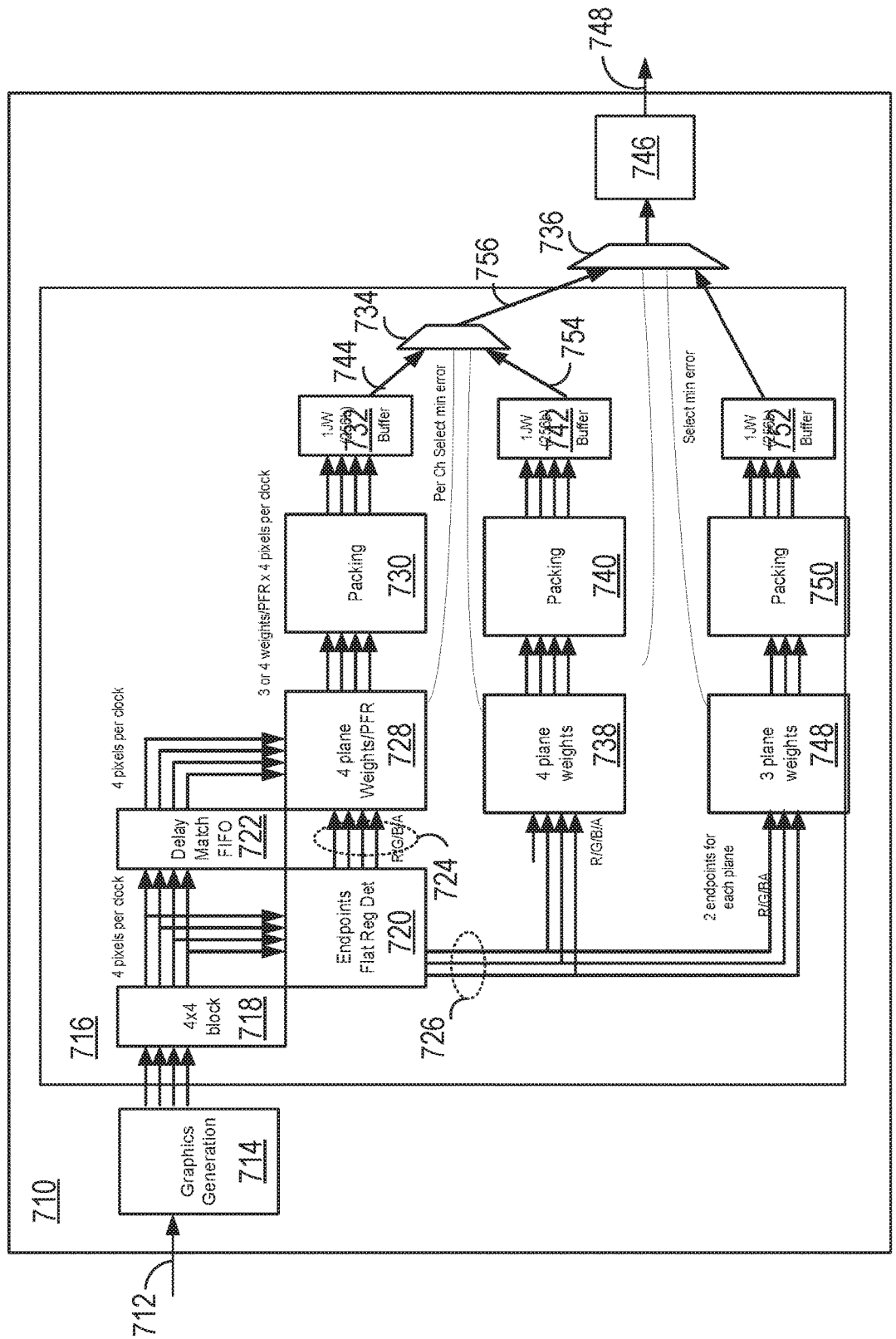
FIG. 7 is a block diagram illustrating a system for processing graphics to determine two representations in parallel in accordance with one or more implementations.

FIG. 7 is a block diagram of a graphics processor that processes four plane and three plane compressions of pixel data in parallel. The graphics processor each pixel block twice, once with 4 planes and once with 3 planes. The result with the smallest error is selected at the output. The system 700 includes a graphics processor 710. In some implementations, the graphics processor 710 is, or includes at least a portion of, the processing unit core 316 of FIG. 3. The graphics processor 710 may receive graphics parameters 712, including for example a video stream, from various sources. The graphics parameters 712 may be provided to a graphics generation module 714. The graphics generation module may graphics data to a graphics compression module 716. The graphics received by the graphics compression module 716 may include various types of static and dynamic graphics.

The compression module 716 may process the graphics in a multi-plane space. For example, the graphics may be represented in a three plane space such as R/G/BA. In other scenarios, the graphics may be represented in separate planes R/G/B/A where the bits are distributed to the separate planes. As such, with regard to the graphics compression module 716, the modules may process a three plane representation and a four plane representation, although processing multiple representations with another number of planes is also contemplated herein.

The graphics compression module 716 may include a pixel block buffer 718. With regard to the system illustrated in FIG. 7 a 4×4 pixel block will be described, although as discussed above other size pixel blocks may also be utilized. The pixel block buffer 718 may provide the pixel data for the pixel block to an endpoint selection module 720 and a delay match buffer 722.

The endpoint selection module 720 may receive pixel data for a pixel block and determine endpoints for the values of the pixels in the pixel block. The pixel blocks may be square blocks, for example 4×4, 8×8, or 16×16 pixels. The pixel blocks may also be non-square blocks. For example, blocks may be used that have more pixels along the direction that corresponds with the raster direction, such as the horizontal direction in most systems, than along the non-raster direction. This would allow the system to process the data more closely with raster order which may be beneficial when processing information that is typically processed in raster order, for example video. In some examples, the pixel blocks may even have a width of a single pixel along the non-raster direction, for example a line of pixels extending along the raster direction. Accordingly, in some systems the pixel blocks may be 8×2 or 16×1. The endpoint selection module 720 may select endpoints for each plane. For example, two endpoints may be selected for each plane such that the pixel values for that plane may be represented as a weighting value between the two endpoints.

The endpoint selection module 720 may quantize the endpoints of a high bit-depth pixel component to a lesser number of bits such that the final compressed block size can still fit in a certain byte size for random access. For example, the endpoint selection module 720 may quantize 10-bit RGB component min/max endpoints to 7-bit min/max endpoints when a 4×4 block of pixels is compressed.

In some implementations, the quantization of the endpoints for 10-bit RGB components may include a bitwise operation such as a right bit shift, where the bits are shifted to the right. For example, the endpoint selection module 720 may quantize a 10-bit RGB component min/max endpoint to 8-bit min/max endpoints by shifting the endpoint bit positions to the right by two, after decompression.

In another example, 8-bit endpoints can be unquantized to 10-bits when a pixel block is decompressed. In some implementations, the unquantization of the endpoints for 10-bit RGB components may include a bitwise operation such as a left bit shift, where the bits are shifted to the left. For example, the endpoint selection module 720 may convert an 8-bit RGB component min/max endpoint to 10-bit min/max endpoints by shifting the minimum endpoint bit positions to the left by two, and shifting the maximum endpoint bit positions to the left by two and adding three bit positions, before compression.

The Alpha endpoint may be quantized from 8-bits in some implementations, or quantized from 10-bits in other implementations. In some implementations, the 8-bit Alpha endpoints may be quantized differently between the 4-plane mode and the 3-plane mode. In some implementations, the 4×4 pixel block may include a quantization select indicator associated with the Alpha endpoint to select a type of alpha quantization depending on the type of plane mode (e.g., 3-plane mode or 4-plane mode). When the quantization select indicator applies to the 4-plane mode, the minimum difference between the minimum and maximum endpoints is 3. The endpoint selection module 720 interpolates the unquantized samples between the minimum and maximum endpoints. When the quantization select indicator applies to the 3-plane mode, the weights may be derived based on the B component.

In some implementations, the endpoint selection module 720 may quantize the 10-bit Alpha endpoints to either 7-bit or 6-bit min/max endpoints based on at least the MIN/MAX difference signaled by a quantization bit-depth indicator. The MIN/MAX alpha endpoints may be further encoded in 11-bit base/offset values, where the base value is either the 6-bit or 7-bit value and the remainder is respectively 5-bit or 4-bit offset values. In this respect, the base value may be represented with the minimum or maximum value, and the offset value may be represented as some form of remainder of the minimum and maximum values. If the difference between the 7-bit minimum and maximum values is small, such as less than a value of 16, and the quantization bit-depth indicator is a value of one, the endpoint selection module 720 quantizes the Alpha endpoint to the 7-bit value, where the base value includes the 7-bit minimum value and the offset value includes the 4-bit difference between the minimum and maximum values. In this respect, The endpoint selection module 720 may quantize a 10-bit Alpha component min/max endpoint to 7-bit Alpha min/max endpoints by shifting the endpoint bit positions to the right by three.

If the difference between the 7-bit minimum and maximum values is large, such as equal to or more than a value of 16, and the quantization bit-depth indicator is set to a value of zero, the endpoint selection module 720 quantizes the Alpha endpoint to the 6-bit value, where the base value includes a 6-bit base value and the offset value includes a 5-bit value. If the difference between (6-bit) MAX and MIN is less than 32, the base value is the 6-bit minimum value (MIN) and the offset is the difference of (MAX−MIN). Otherwise, the base value is the maximum value and the offset value is the remainder of (63−MAX+MIN). In this respect, the quantization of a 10-bit Alpha component min/max endpoint to 6-bit Alpha min/max endpoints may include shifting the endpoint bit positions to the right by four.

The endpoint selection module 720 may convert a 7-bit Alpha min/max endpoint to 10-bit Alpha min/max endpoints by shifting the minimum endpoint bit positions to the left by three, and shifting the maximum endpoint bit positions to the left by three and adding a value of seven (7), before compression. In some implementations, the endpoint selection module 720 may convert a 6-bit Alpha min/max endpoint to 10-bit Alpha min/max endpoints by shifting the minimum endpoint bit positions to the left by four, and shifting the maximum endpoint bit positions to the left by four and adding a value of fifteen (15), before compression.

Once the endpoints are quantized and selected by the endpoint selection module 720, the selected endpoints 724 for the four plane representation having partial flat region information may be communicated to a weight selection module 728. The selected endpoints 724 may include two endpoints for each plane. In the example of four plane representation, two endpoints for the red plane, two endpoints for the green plane, two endpoints for the blue plane, and two endpoints for the alpha plane may be selected and communicated. The selected endpoints 726 for the four plane representation excluding the partial flat region information may be communicated to a weight selection module 738. The selected endpoints 726 for the three plane representation may also be communicated to a weight selection module 748. In the example of three plane representation, two endpoints for the red plane, two endpoints for the green plane, and two endpoints for the blue-alpha plane may be selected and communicated.

The weight selection module 728 may receive pixel data for the pixel block from the delay match buffer 722 and determine a weight for each pixel of the pixel block. As such, a weight may be determined for each plane relative to the selected endpoints for each plane. The endpoints and the weights are provided to a packing module 730. The packing module 730 may receive the endpoints for the pixel block and the weight for each pixel of the pixel block corresponding to the endpoints. The packing module 730 generates compressed data representative of the pixel block based on the endpoints and the weights. For example, the endpoints for the pixel block may be communicated then each pixel value may be represented as a weighting relative to the endpoints. The endpoints and weighting may be determined and communicated for each plane thereby representing each corresponding component of the pixel value. The compressed data may be communicated to a buffer 732.

The weight selection module 738 may receive pixel data for the pixel block from the delay match buffer 722 and determine a weight for each pixel of the pixel block. As such, a weight may be determined for each plane relative to the selected endpoints for each plane. The endpoints and the weights are provided to a packing module 740. The packing module 740 may receive the endpoints for the pixel block and the weight for each pixel of the pixel block corresponding to the endpoints. The packing module 740 generates compressed data representative of the pixel block based on the endpoints and the weights. The compressed data may be communicated to a buffer 742.

The weight selection module 748 may receive pixel data for the pixel block from the delay match buffer 722 and determine a weight for each pixel of the pixel block. As such, a weight may be determined for each plane relative to the selected endpoints for each plane. The endpoints and the weights are provided to a packing module 740. The packing module 750 may receive the endpoints for the pixel block and the weight for each pixel of the pixel block corresponding to the endpoints. The packing module 750 generates compressed data representative of the pixel block based on the endpoints and the weights. The compressed data may be communicated to a buffer 752.

A comparison module 734 receives a first weighting error 744 from the weight selection module 728 and a second weighting error 754 from the weight selection module 738. The comparison module 734 compares the first weighting error 744 with the second weighting error 754 to determine whether the four plane weighting associated with PFR or the four plane weighting not associated with PFR has less error. If the first weighting error 744 has less error, the comparison module 734 retrieves the compressed data represented in the four plane weighting associated with PFR from the buffer 732 and makes it available for further comparison with the three plane weighting from the buffer 752 via the comparison module 736. Otherwise, the comparison module 734 retrieves the compressed data represented in the four plane weighting not associated with PFR from the buffer 742 and makes it available for further comparison with the three plane weighting from the buffer 752 via the comparison module 736.

If the four plane weighting error 756 has less error, the comparison module 736 retrieves the compressed data represented in the four plane weighting from the comparison module 734 and makes it available for further use, such as further processing 746, and/or transmission 748. Otherwise, the comparison module 736 retrieves the three plane weighting from the buffer 752 and makes it available for further use, such as further processing 746, and/or transmission 748.

Figure 8:
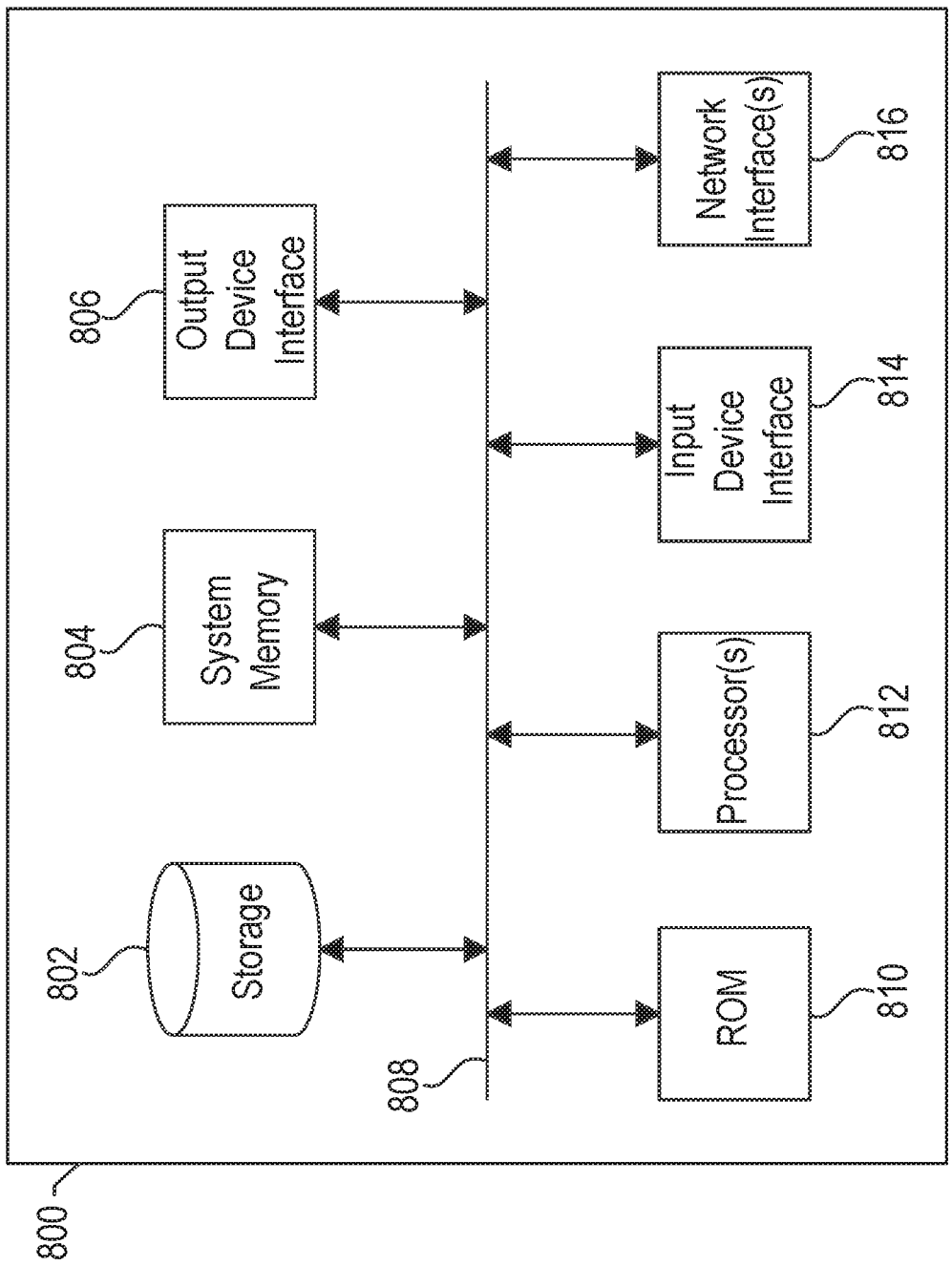
FIG. 8 conceptually illustrates an electronic system with which any implementations of the subject technology are implemented.

FIG. 8 conceptually illustrates an electronic system 800 with which one or more implementations of the subject technology may be implemented. The electronic system 800, for example, can be a network device, a media converter, a desktop computer, a laptop computer, a tablet computer, a server, a smartphone, or generally any electronic device that encodes and/or decodes video and/or audio streams. Such an electronic system 800 includes various types of computer readable media and interfaces for various other types of computer readable media. The electronic system 800 includes a bus 808, one or more processing unit(s) 812, a system memory 804, a read-only memory (ROM) 810, a permanent storage device 802, an input device interface 814, an output device interface 806, and a network interface 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system. The permanent storage device 802, on the other hand, is a read-and-write memory device. The permanent storage device 802 is a non-volatile memory unit that stores instructions and data even when the electronic system 800 is off. One or more implementations of the subject disclosure use a mass-storage device (such as a magnetic or optical disk and its corresponding disk drive) as the permanent storage device 802.

Other implementations use a removable storage device (such as a floppy disk, flash drive, and its corresponding disk drive) as the permanent storage device 802. Like the permanent storage device 802, the system memory 804 is a read-and-write memory device. However, unlike the permanent storage device 802, the system memory 804 is a volatile read-and-write memory, such as random access memory. System memory 804 stores any of the instructions and data that the one or more processing unit(s) 812 needs at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input device interface 814 and the output device interface 806. The input device interface 814 enables a user to communicate information and select commands to the electronic system. Input devices used with the input device interface 814 include, for example, alphanumeric keyboards and pointing devices (also called "cursor control devices"). The output device interface 806 enables, for example, the display of images generated by the electronic system 800. Output devices used with the output device interface 806 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks (not shown) through one or more network interfaces 816. In this manner, the computer can be a part of one or more network of computers, such as a peer-to-peer network, a local area network ("LAN"), a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "processor" and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A graphics processor comprising:
   an endpoint selection module configured to:
      receive pixel data for a pixel block,
      obtain endpoints of a first bit length based on the pixel data in the pixel block,
      quantize the endpoints to a second bit length smaller than the first bit length, and
      select the quantized endpoints for pixel values in the pixel block;
   a weight selection module configured to:
      receive the pixel data for the pixel block, and
      determine a weight for each pixel of the pixel block in each of a plurality of planes corresponding to the endpoints selected for the pixel block by the endpoint selection module; and
   a packing module configured to:
      receive the endpoints for the pixel block and the weight for each pixel of the pixel block in each of the plurality of planes corresponding to the endpoints, and
      generate a compressed data block representative of the pixel block.

2. The graphics processor of claim 1, wherein the plurality of planes includes four planes that respectively correspond to an independent red plane, an independent green plane, an independent blue plane, and an independent alpha plane.

3. The graphics processor of claim 1, wherein the plurality of planes includes three planes that respectively correspond to an independent red plane, an independent green plane, and a pairing of a blue plane with an alpha plane.

4. The graphics processor of claim 1, wherein the first bit length corresponds to 10 or more bits and the second bit length corresponds to 8-bits.

5. The graphics processor of claim 1, wherein the endpoint selection module is configured to quantize a minimum endpoint and a maximum endpoint for three planes of the plurality of planes from the first bit length to the second bit length when the pixel block is compressed, wherein the three planes exclude an alpha plane.

6. The graphics processor of claim 5, wherein the endpoint selection module is configured to perform a right shift operation on the minimum endpoint and the maximum endpoint to convert the endpoints into the second bit length.

7. The graphics processor of claim 6, wherein the endpoint selection module is configured to shift each of the minimum endpoint and the maximum endpoint to the right by two bit positions.

8. The graphics processor of claim 1, wherein the endpoint selection module is configured to unquantize a minimum endpoint and a maximum endpoint from the second bit length to the first bit length when the pixel block is decompressed.

9. The graphics processor of claim 8, wherein the endpoint selection module is configured to perform a left shift operation on the minimum endpoint and the maximum endpoint to convert the endpoints into the first bit length.

10. The graphics processor of claim 9, wherein the endpoint selection module is configured to shift the minimum endpoint to the left by two bit positions and shift the maximum endpoint to the left by two bit positions and adding a value of three.

11. The graphics processor of claim 1, wherein the endpoints include an alpha endpoint that corresponds to an alpha plane of the plurality of planes, and wherein the endpoint selection module is configured to quantize the alpha endpoint from the first bit length to a third bit length smaller than the first bit length.

12. The graphics processor of claim 11, wherein the endpoint selection module is configured to quantize the alpha endpoint differently between a first plane mode and a second plane mode for the pixel block, wherein the first plane mode include four planes and the second plane mode includes three planes.

13. The graphics processor of claim 12, wherein the pixel block includes a first indicator associated with the alpha endpoint to select a type of alpha quantization depending on which of the first plane mode or the second plane mode is associated with the pixel block.

14. The graphics processor of claim 13, wherein the endpoint selection module is configured to quantize the alpha endpoint from the first bit length to either a third bit length or a fourth bit length based at least on a maximum and minimum range difference signaled by a second indicator having a value of one.

15. The graphics processor of claim 14, wherein the endpoint selection module is configured to quantize the alpha endpoint from the first bit length to the third bit length when the second indicator has a value of zero.

16. The graphics processor of claim 15, wherein the first bit length corresponds to 10 or more bits and the third bit length corresponds to 6-bits.

17. The graphics processor of claim 15, wherein the first bit length corresponds to 8-bits and the third bit length corresponds to 6-bits.

18. The graphics processor of claim 14, wherein the endpoint selection module is configured to quantize the alpha endpoint from the first bit length to the fourth bit length when the second indicator is present in the pixel block.

19. The graphics processor of claim 18, wherein the first bit length corresponds to 10 or more bits and the fourth bit length corresponds to 7-bits.

20. The graphics processor of claim 18, wherein the first bit length corresponds to 8-bits and the fourth bit length corresponds to 7-bits.

21. The graphics processor of claim 14, wherein the endpoint selection module is configured to perform a left shift operation on the minimum endpoint and the maximum endpoint of an alpha plane of the plurality of planes to convert the endpoints into either the third bit length or the fourth bit length.

22. The graphics processor of claim 21, wherein the endpoint selection module is configured to shift each of the minimum endpoint and the maximum endpoint to the right by three bit positions when the second indicator has a value of one in the pixel block.

23. The graphics processor of claim 21, wherein the endpoint selection module is configured to shift each of the minimum endpoint and the maximum endpoint to the right by four bit positions when the second indicator has a value of zero in the pixel block.

24. The graphics processor of claim 21, wherein the endpoint selection module is configured to:
detect a partial flat region within the pixel block,
apply an average value from values of flat region pixels in the partial flat region, and
apply individual weights to pixels outside of the partial flat region.

25. A device comprising:
at least one processor configured to:
receive pixel data for a pixel block;
obtain endpoints of a first bit length based on the pixel data in the pixel block;
quantize the endpoints to a second bit length smaller than the first bit length;
select the quantized endpoints for pixel values in the pixel block;
determine a weight for each pixel of the pixel block in each of a plurality of planes corresponding to the endpoints selected for the pixel block; and
generate a compressed data block representative of the pixel block based at least on the endpoints for the pixel block and the weight for each pixel of the pixel block in each of the plurality of planes corresponding to the endpoints.

26. A method for processing graphics comprising:
receiving, by at least one processor, pixel data for a pixel block;
obtaining endpoints of a first bit length based on the pixel data in the pixel block;
quantizing the endpoints to a second bit length smaller than the first bit length;
selecting the quantized endpoints for pixel values in the pixel block;
determining a weight for each pixel of the pixel block in each of a plurality of planes corresponding to the endpoints selected for the pixel block; and
generating a compressed data block representative of the pixel block based at least on the endpoints for the pixel block and the weight for each pixel of the pixel block in each of the plurality of planes corresponding to the endpoints.

27. A computer program product comprising instructions stored in a tangible computer-readable storage medium, the instructions comprising:
instructions for receiving pixel data for a pixel block;
instructions for obtaining endpoints of a first bit length based on the pixel data in the pixel block;
instructions for quantizing the endpoints to a second bit length smaller than the first bit length;
instructions for selecting the quantized endpoints for pixel values in the pixel block;
instructions for determining a weight for each pixel of the pixel block in each of a plurality of planes corresponding to the endpoints selected for the pixel block; and instructions for generating a compressed data block representative of the pixel block based at least on the endpoints for the pixel block and the weight for each pixel of the pixel block in each of the plurality of planes corresponding to the endpoints.

* * * * *